United States Patent [19]
Katayama et al.

[11] Patent Number: 5,157,568
[45] Date of Patent: Oct. 20, 1992

[54] FLOATING TYPE MAGNETIC HEAD DEVICE

[75] Inventors: Hiroyuki Katayama; Junichiro Nakayama; Tomoyuki Miyake; Kenji Ohta, all of Nara, Japan

[73] Assignee: Sharp Kabushiki Kaisha, Osaka, Japan

[21] Appl. No.: 624,404

[22] Filed: Dec. 7, 1990

[30] Foreign Application Priority Data

Dec. 12, 1989 [JP] Japan .................... 1-323323

[51] Int. Cl.$^5$ .................... G11B 5/48; G11B 5/60; G11B 15/64
[52] U.S. Cl. .................... 360/103; 360/102; 360/104
[58] Field of Search .................... 360/102, 103, 104

[56] References Cited

U.S. PATENT DOCUMENTS

| | | | |
|---|---|---|---|
| 3,670,112 | 1/1972 | Ruszczyk et al. | 360/103 |
| 4,814,907 | 3/1989 | Goor | 360/103 |
| 5,012,366 | 4/1991 | Ohkita et al. | 360/102 |

FOREIGN PATENT DOCUMENTS

| | | | |
|---|---|---|---|
| 52-2420 | 10/1977 | Japan | 360/103 |
| 60-29987 | 2/1985 | Japan | 360/103 |
| 2-15458 | 1/1990 | Japan | 360/102 |
| 2-156493 | 6/1990 | Japan | 360/103 |
| 0617783 | 7/1978 | U.S.S.R. | 360/103 |
| 669395 | 7/1979 | U.S.S.R. | 360/103 |
| 0988021 | 3/1965 | United Kingdom . | |

OTHER PUBLICATIONS

Tanaka et al., "Measurements of Transient Motion of Magnetic Disk Slider", IEEE Transactions on Magnetics, vol. MAG-20, No. 5, Sep. 1984, pp. 924-926.

*Primary Examiner*—John H. Wolff
*Attorney, Agent, or Firm*—David G. Conlin; Robert F. O'Connell

[57] ABSTRACT

A floating type magnetic head device of the present invention includes a slider capable of floating above a recording medium while moving relatively to the recording medium, and a magnetic head. The magnetic head is incorporated inside a cavity section formed substantially in the center of the slider. By incorporating the magnetic head inside the cavity section, the magnetic head can be protected, thereby reducing a possibility of head crash of the magnetic head due to its contact with dust or a projecting object existing on the surface of the recording medium. Further, by disposing the magnetic head substantially in the center of the slider, it can be avoided that the direction of an air stream at the center of the slider varies depending on an instantaneous position in a radial direction of the recording medium, thereby providing stable floating characteristics of the floating type magnetic head device and improving accuracy of recording.

4 Claims, 5 Drawing Sheets

FLOATING TYPE MAGNETIC HEAD DEVICE

FIELD OF THE INVENTION

The present invention relates to a floating type magnetic head device which is provided in a magneto-optical recording-reproduction apparatus, magnetic recording-reproduction apparatus, or other apparatus, in order to permit recording, reproducing, erasing and/or overwriting operations to be performed on a recording medium for use therein.

BACKGROUND OF THE INVENTION

Magneto-optical disk devices have been noted as devices which permit overwriting and further realize high-density and large-capacity recording and/or reproducing operations. At present, international standardization with respect to those devices has been under consideration, and some models for practical applications have been sold on the market, which may be referred to as the first generation of those devices. Further, the technological development of magneto-optical disk devices has been rapidly carried out with a view to achieving a higher speed of operation and better functioning of the devices.

Among those studies of the devices, the one which is most actively engaged in is that of overwriting technique for enabling higher recording speeds. Overwriting is one of the recording methods wherein new information can be written directly on a recorded area of a recording medium without the necessity of initializing the area bearing previous information beforehand. In the aspect of magneto-optical recording, so-called magnetic field modulation method is considered as a prospective overwriting technique. In the magnetic field modulation method, an auxiliary magnetic field is applied to a portion on a recording medium irradiated by a light beam such that the direction of magnetization is inverted according to information to be recorded. In principle, the mechanism for generating the auxiliary magnetic field includes an electro-magnet.

Meanwhile, conventionally electro-magnets of winding type are suggested in constituting the auxiliary magnetic field generating mechanism (see Japanese Patent Laid-Open Publication No. 279504/1987 (Tokukaisho 62-279504)). However, electro-magnets of this type present problems that it is difficult to obtain high speed inversion of the magnetic field in accordance with information to be recorded because of high impedance of the coil and that considerably large power consumption is necessary to apply an enough magnetic field to a recording area since an efficient application of magnetic field to the recording area is difficult to achieve.

Therefore, in order to provide high-speed switching of the magnetic field in the above-mentioned auxiliary magnetic field generating mechanism, floating type magnetic heads are proposed (see Jpn. J. Appl. Phys., Vol. 26, (1987) Suppl. 26 - 4, pp. 147-154 by T. Nakao, M. Ojima, T. Miyamura, S. Okamine, H. Sukeda, N. Ohta and Y. Takeuti). As the floating type magnetic head, a magnetic head which is miniaturized as small as that for use with a hard disk is adopted. Further, the floating magnetic head is designed so as to float above a rotating magneto-optical disk, having a gap of substantial several $\mu m$ to several tens of $\mu m$ in between.

As illustrated in FIG. 4, the floating type magnetic head normally includes a slider 1 for permitting sliding movements with a floating state above a magneto-optical disk (not shown) and a magnetic head 4 having a magnetic core 2 and a coil 3. The magnetic head 4 is fixedly secured to the slider 1 from the outside at the end portion thereof from which an air stream flows out when the slider 1 slides with a floating state. The reason why the floating type magnetic head can float is that an air pressure is produced by the air stream flowing into a contact surface between the magneto-optical disk and the slider 1 due to the rotation of the magneto-optical disk. A predetermined gap between the magnetic head 4 and the magneto-optical disk is maintained through a mechanical balance between the above air pressure and a pressure applied by a suspension, not shown, whereto the floating type magnetic head is secured, so as to depress the slider 1 to the magneto-optical disk. Overwriting operation for information is performed by inverting the direction of the magnetic field according to information to be recorded with the floating state of the magnetic head 4.

However, in the structure as described above where the magnetic head 4 is fixedly secured to the slider 1 from the outside at the end portion thereof, so-called head crash might occur. Here, head crash is a trouble caused by a fact that when on the surface of the magneto-optical disk there exists dust or a projecting object greater than the gap between the magneto-optical disk and the magnetic head, the magnetic head 4 is damaged due to its contact with the dust or the projecting object.

Further, in magneto-optical devices, in order to effectively apply a magnetic field to a recording area, it is important to conform the center of the magnetic pole of the magnetic head 4 to the center of a light beam focused on the disk by an optical head, not shown. Here, as illustrated in FIG. 5, in a recording, reproducing, or other operation, the center of the magnetic pole of the magnetic head 4 being positioned above a track 6 formed on the magneto-optical disk 5 is assumed to move linearly in the radial direction toward the circumferential side while relatively moving above the magneto-optical disk 5 in a rotation direction. (O' in FIG. 5 represents the center of the magneto-optical disk 5.) In this case, the direction of an air stream at the center of the slider 1 varies depending on an instantaneous position in a radial direction on the magneto-optical disk 5. This will be obviously shown by comparing an arrow B located at an inner section of the magneto-optical disk 5 with an arrow C at an outer section thereof. The floating characteristics of the slider vary according to the direction of the air stream, and consequently the gap between the magnetic head 4 and the magneto-optical disk 5 changes depending on an instantaneous position in a radial direction on the magneto-optical disk 5. This causes an adverse effect that intensity of a magnetic field to be applied by the magnetic head 4 might vary undesirably. In other words, a magnetic field should be applied by the magnetic head 4 right onto the central position of an optical beam projected on the magneto-optical disk, that is, an access position where recording is to be performed; however, in the arrangement described above, intensity of a magnetic field to be applied by the magnetic head 4 is caused to change depending on an instantaneous position in the radial direction on the magneto-optical disk, thereby presenting a problem that accuracy of recording is adversely affected.

SUMMARY OF THE INVENTION

It is an object of the present invention to provide a floating type magnetic head device which is capable of preventing head crash of a magnetic head installed therein.

It is another object of the present invention to provide a floating type magnetic head device capable of maintaining uniform floating characteristics of a slider regardless of an instantaneous position in a radial direction on a magneto-optical disk, whereby accuracy of recording can be improved.

In order to achieve the above objects, a floating type magnetic head device of the present invention is characterized in that a cavity section is provided substantially in a center of a slider installed therein which floats above a recording medium while moving relatively to the recording medium, and that a magnetic head is incorporated inside the cavity section.

With the above arrangement, since the magnetic head is protected by the slider without having any part thereof exposed to the outside of the slider, a possibility that head crash of the magnetic head may occur due to its contact with dust or a projecting object existing on the surface of the recording medium is remarkably reduced.

Further, the magnetic head is disposed in the cavity section situated substantially in the center of the slider; therefore, the direction of an air stream at the center of the slider is maintained substantially constant regardless of an instantaneous position in a radial direction of the recording medium, and consequently floating characteristics of the floating type magnetic head device are maintained substantially constant regardless of an instantaneous position in a radial direction of the recording medium. Thus, accuracy of recording can be improved.

For a fuller understanding of the nature and advantages of the invention, reference should be made to the ensuing detailed description taken in conjunction with the accompanying drawings.

BRIEF DESCRIPTION OF THE DRAWINGS

FIG. 4 is a schematic perspective view of a floating type magnetic head.

FIG. 5 is a schematic plan view showing a direction of an air stream at the center of a slider on a magneto-optical disk.

DESCRIPTION OF THE EMBODIMENTS

Figure 1:
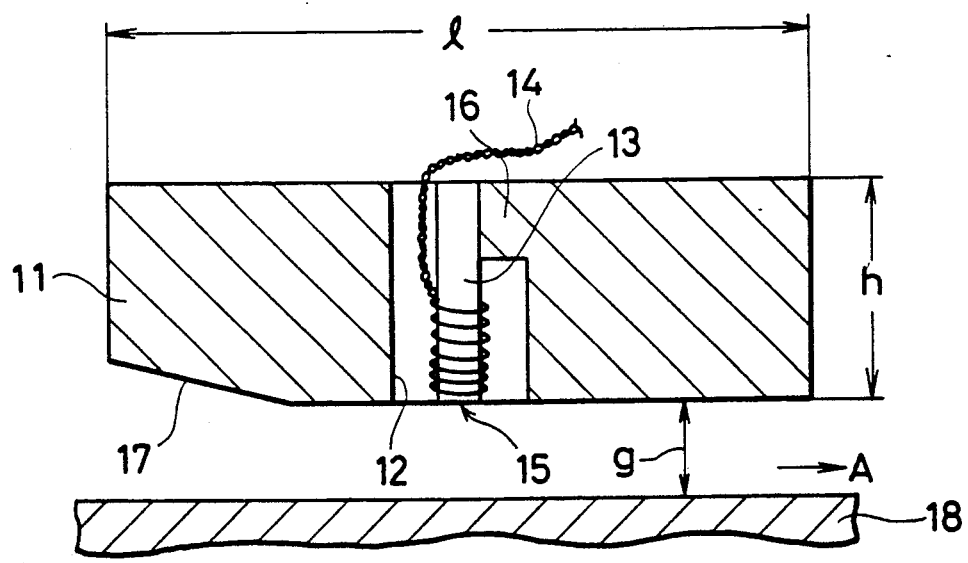
FIG. 1 which shows one embodiment of the present invention, is a schematic vertical sectional view of a floating type magnetic head device.

The following description will discuss one embodiment of the present invention referring to FIG. 1.

A floating type magnetic head device in accordance with the present invention may be incorporated in a magneto-optical disk device for performing magneto-optical recording, for example, on a disk-shaped vertical magnetizing medium by using the magnetic field modulation method. Further, the present invention is applicable to a magnetic head for use in conventional magnetic recording devices for recording on a magnetic disk.

The floating type magnetic head device includes a slider 11 which is substantially rectangular parallelepiped in shape. Substantially in the center of the slider 11, is formed a cavity section 12 penetrating the slider 11 in the direction perpendicular to its gliding plane. Further, one end portion of the gliding plane of the slider 11 forms an inclined face 17. The inclined face 17 has a function to lead an air stream between the gliding plane of the slider and a magneto-optical disk 18 as a recording medium when the magneto-optical disk 18 rotatively moves in a direction indicated by an arrow A in FIG. 1.

On the other hand, in the cavity section 12 is disposed a magnetic head 15 comprising a magnetic core 13 and a coil 14 wound around the magnetic core 13. The upper portion of the magnetic core 13 is fixedly secured by the use of adhesive or the like to a protruded wall 16 protruding inside the cavity section 12. The bottom surface of the magnetic core 13 and that of the slider 11 (namely, the gliding surface) are positioned substantially on the same plane. The slider 11 may be made up of ceramic (for example, barium titanate) with a total length l of 6 mm, a total height h of 1.5 mm and a total length (that is, a size in the direction orthogonal to both directions of the length and the height) of 4 mm. Moreover, as a concrete example, the coil 14 is composed of a Cu wire with a diameter of 50 $\mu$m, which is wound in 15 turns around a magnetic core 13 made up of prismatic ferrite with a bottom size of 0.2 mm × 0.2 mm and a height of 1.5 mm.

The slider 11 is always depressed downward, that is, toward the magneto-optical disk 18 side by a suspension, not shown, and the gliding plane thereof comes into contact with the surface of the magneto-optical disk 18 when rotation of the magneto-optical disk 18 is stopped. Additionally, although not shown in the figures, the magneto-optical disk device is provided with an optical head, a driving section for rotating the magneto-optical disk 18 and other sections, besides the floating type magnetic head device.

In the above arrangement, when the magneto-optical disk 18 rotatively moves in the direction indicated by the arrow A in FIG. 1, an air stream produced by the rotative movement is allowed to flow between the gliding plane of the slider 11 and the surface of the magneto-optical disk 18 through the inclined face 17, thereby causing a floating force to the slider 11. With this mechanism, the slider 11 is permitted to float up to a height where the floating force just balances the depressing force by the suspension, and therefore a length g of a resulting gap between the gliding plane and the magneto-optical disk 18 is kept at a predetermined value.

In this condition, a magnetic field capable of inverting according to information to be recorded is applied onto the magneto-optical disk 18 by the magnetic head 15, and simultaneously a laser beam is projected onto the magneto-optical disk 18 by the optical head, thereby permitting the information to be over-written on previous information. Additionally, in this case, reproducing operation is performed through the optical head.

Figure 3:
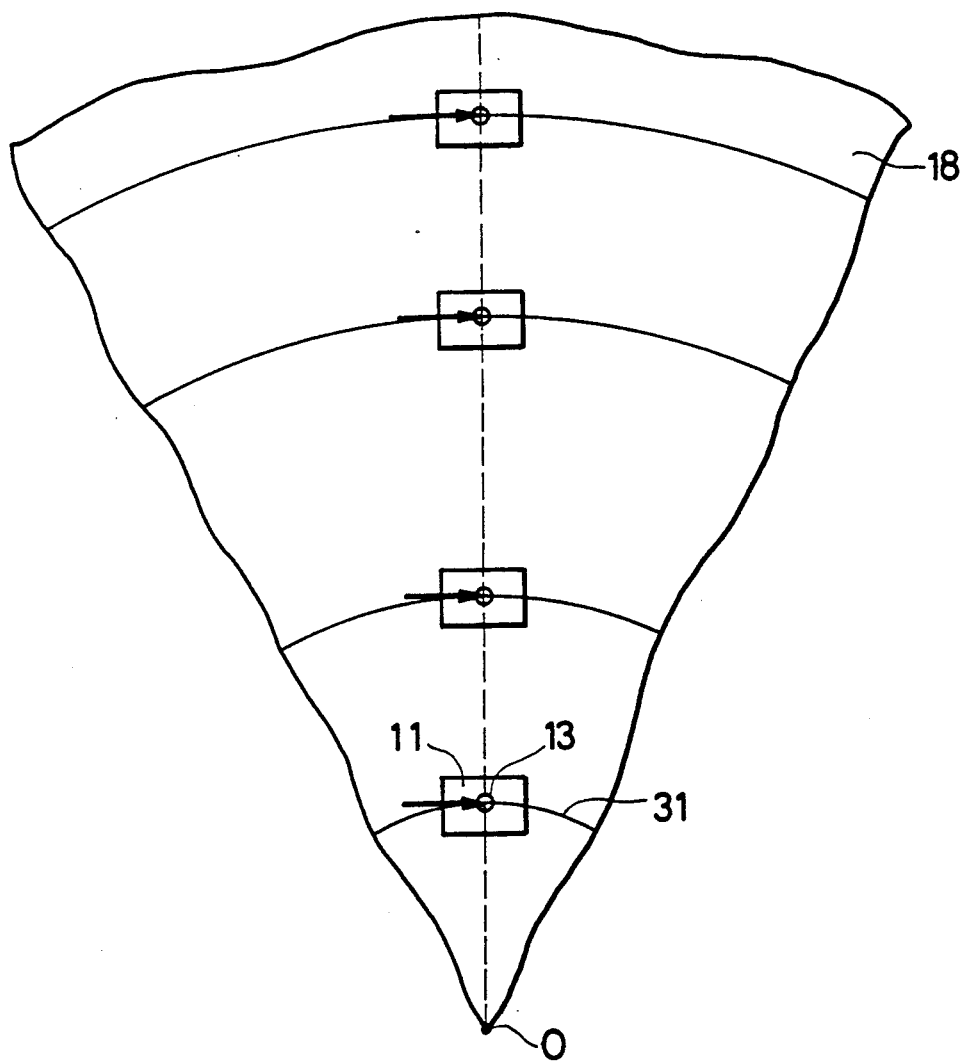
FIG. 3 is a schematic plan view showing a direction of an air stream at the center of a slider on a magneto-optical disk.
Figure 4:
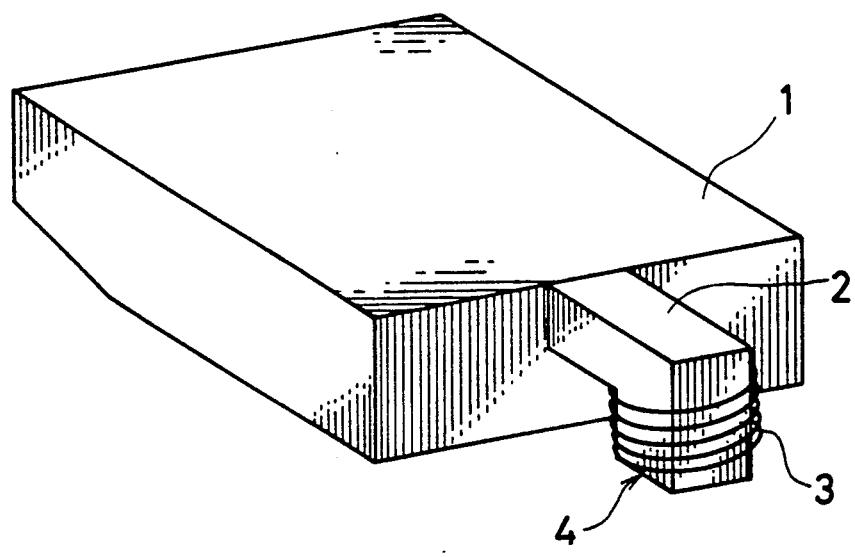
FIGS. 4 and 5 show the prior art.
Figure 5:
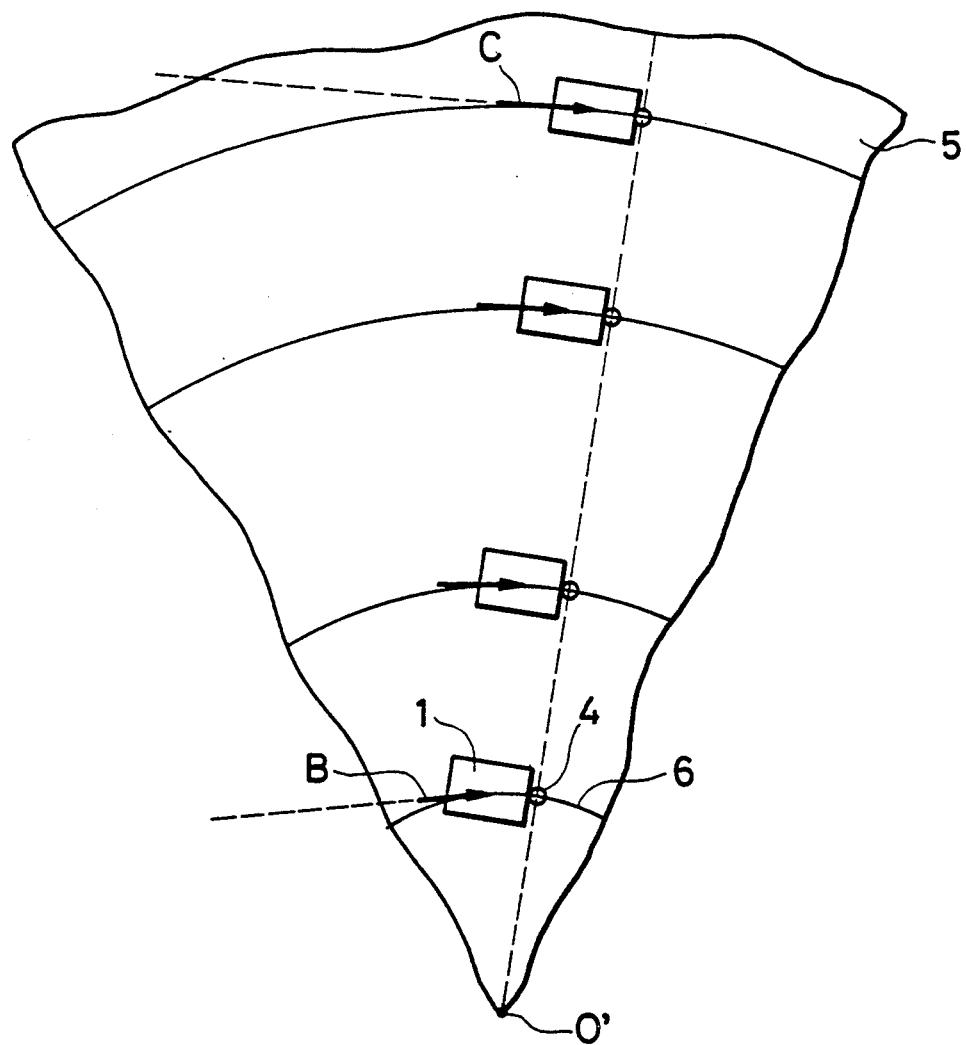

In the present embodiment, the value of the length g of the gap becomes slightly smaller than that of a conventional model due to the cavity section 12 formed in the slider 11; however, a floating type magnetic head of the present invention has an important advantage in that since the central position of the magnetic head 15 is adapted to coincide with the central position of the slider 11, the direction of an air stream at the center of the slider 11 is maintained constant regardless of an instantaneous position in a radial position on the magneto-optical disk 18. More concretely, as illustrated in FIG. 3, suppose that in a recording, reproducing, or other operation, the center of the magnetic pole of the magnetic head 13 being positioned above a track 31 formed on the magneto-optical disk 18 moves linearly in the radial direction toward the circumferential side while relatively moving above the magneto-optical disk 18 in a rotation direction. (O in FIG. 3 represents the center of the magneto-optical disk.) In this case, as is obviously shown by FIG. 3, the direction of an air stream at the center of the slider 11 is maintained constant regardless of an instantaneous position on the magneto-optical disk 18. Therefore, floating characteristics of the floating type magnetic head device are maintained constant regardless of an instantaneous position in a radial direction on the magneto-optical disk 18. Consequently, a magnetic field having an enough intensity can be constantly and stable applied by the magnetic head 15 onto a center of a spot of a laser beam projected on the magneto-optical disk 18 by the optical head, thereby improving accuracy of recording. Further, the magnetic head 15 is enclosed by walls of the cavity section 12 in every side, and therefore, even if there exists dust or a projecting object on the surface of the magneto-optical disk 18, occurrence of head crash due to contact of the magnetic head 15 with that can be reduced.

Additionally, not limited to the aforementioned materials, the slider 11 may be made up of, for example, Al, Al₂O₃, ferrite, or other materials. Moreover, the shape of the slide may be altered according to a rotation speed of the magneto-optical disk 18, a depressing condition by the suspension, a required floating gap, or other factors.

Furthermore, in the above embodiment, the magnetic head 15 is simply inserted into the cavity section 12 and fixedly secured thereto; however, in lieu of this structure, a space existing between the walls of the cavity section 12 and the magnetic head 15 may be filled with non-magnetic resin or the like. With the structure, protection effect for the magnetic head 15 can be further increased, and since no portion of the air stream flowing along the bottom surface of the slider 11 is allowed to escape upward through the cavity section 12 of the slider 11, the length g of the gap between the slider 11 in floating state and the magneto-optical disk 18 ca be widened.

Figure 2:
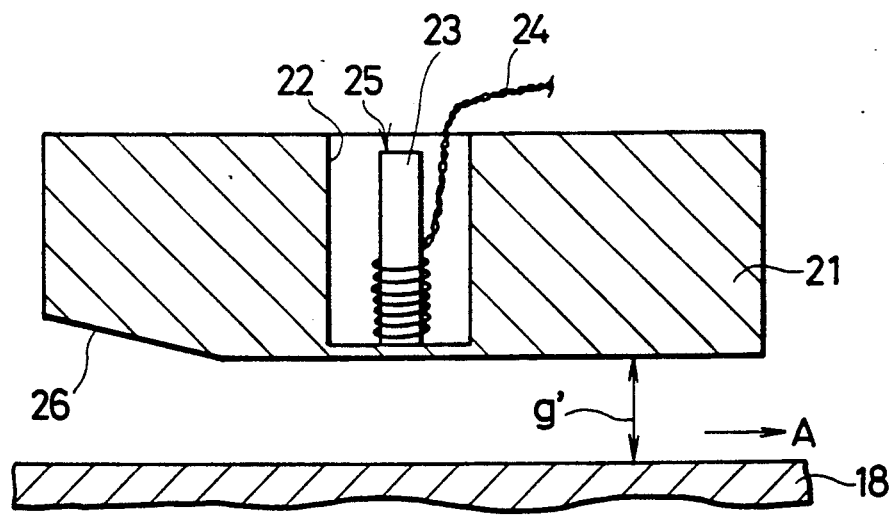
FIG. 2 which shows another embodiment of the present invention, is a schematic vertical sectional view of a floating type magnetic head device.

The following description will discuss a second embodiment of the present invention referring to FIG. 2.

A floating type magnetic head device of the second embodiment also includes a slider 21, and a cavity section 22 is formed substantially in the center of the slider 21. However, the cavity section 22 has an opening only at the upper end thereof, and at the bottom part of the cavity section 22 is disposed a very thin bottom wall.

In the cavity section 22 is disposed a magnetic head 25 comprising a magnetic core 23 and a coil 24 wound around the magnetic core 23. The bottom face of the magnetic core 23 is fixed to the bottom wall with adhesive or the like. Additionally, as with the aforementioned embodiment, one end portion of a gliding plane of the slider 21 forms an inclined face 26, and the slider 21 is depressed toward a magneto-optical disk 18 side by a suspension not shown.

The operation of the second embodiment is substantially the same as that of the first embodiment. However, since the cavity section 22 is formed without penetrating the guiding plane of the slider 21, because of the existence of the very thin bottom wall located at the bottom part of the cavity section 22, the entire guiding plane of the slider 21 can be shaped as uniformly as that of a conventional one. Further, a length g' of a gap between the slider 21 in a floating state and the magneto-optical disk 18 becomes greater than the length g of the aforementioned embodiment, thereby maintaining a floating gap substantially identical to that of a conventional one. This allows alternations in designing the floating type magnetic head device to be minimized.

In addition, it is beneficial in releasing heat produced in the magnetic core 23 to have an arrangement wherein the upper end portion of the magnetic core 23 is adapted to contact with the wall of the cavity section 22.

As described above, the floating type magnetic head device of the present invention includes a cavity section provided substantially in a center of a slider installed therein and a magnetic head incorporated inside the cavity section.

With the arrangement, since no part of the magnetic head is exposed to the outside of the slider, a possibility that the magnetic head is damaged by head crash due to its contact with dust or a projecting object existing on the surface of the recording medium is remarkably reduced.

Further, since the magnetic head is disposed in a vicinity of the center of the slider, it can be avoided that the direction of an air stream at the center of the slider varies depending on an instantaneous position in a radial direction of the recording medium, thereby providing stable floating characteristics of the floating type magnetic head device and improving accuracy of recording.

The invention being thus described, it may be obvious that the same may be varies in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A floating type magnetic head device comprising:
    a slider which floats above a disk-shaped recording medium while moving relatively to the recording medium, the slider having a cavity section provided substantially in the center thereof and a bottom face opposite to the recording medium, and
    a magnetic head for recording and/or reproducing information on/or from the recording medium, the magnetic head being completely housed within the cavity section,
    wherein air flow direction created between the bottom face of the slider and the recording medium by the relative movement thereof is maintained substantially constant independently of the radial position of the magnetic head with respect to the recording medium.

2. A floating type magnetic head device as set forth in claim 1, wherein the cavity section penetrates the slider perpendicularly to a gliding plane thereof above the recording medium;

a bottom surface of the magnetic head opposite to the recording medium and the gliding plane of the slider are disposed substantially on the same plane; and an upper portion of the magnetic head is fixedly secured to a wall of the cavity section.

3. A floating type magnetic head device as set forth in claim 2, wherein a space existing between the magnetic head and walls of the cavity section is filled with non-magnetic resin.

4. A floating type magnetic head device as set forth in claim 1, wherein the cavity section is formed perpendicularly to the gliding plane from an upper side of the slider without penetrating the slider; and a bottom surface of the magnetic head is fixed to an inner surface of a bottom wall of the cavity section, whereby a magnetic field produced by the magnetic head is applied onto the recording medium through the bottom wall.

* * * * *